United States Patent
Thenthiruperai et al.

(10) Patent No.: US 8,010,080 B1
(45) Date of Patent: Aug. 30, 2011

(54) PREDICTIVE PAYMENT SUGGESTION IN A TELECOMMUNICATION SYSTEM

(75) Inventors: Balaji S. Thenthiruperai, Overland Park, KS (US); Jesse M. Kates, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 458 days.

(21) Appl. No.: 11/188,305

(22) Filed: Jul. 25, 2005

(51) Int. Cl.
*H04M 11/00* (2006.01)
*H04M 15/00* (2006.01)

(52) U.S. Cl. ............... 455/406; 379/114.01; 379/114.16

(58) Field of Classification Search .......... 455/405–408; 379/114.01, 114.03, 114.16, 114.17, 114.28, 379/121.02, 128
See application file for complete search history.

(56) References Cited

U.S. PATENT DOCUMENTS

| | | |
|---|---|---|
| 4,870,408 A | 9/1989 | Zdunek et al. |
| 5,442,809 A | 8/1995 | Diaz et al. |
| 5,568,511 A | 10/1996 | Lampe |
| 5,710,591 A | 1/1998 | Bruno et al. |
| 5,818,836 A | 10/1998 | DuVal |
| 5,850,611 A | 12/1998 | Krebs |
| 5,884,196 A | 3/1999 | Lekven et al. |
| 5,936,964 A | 8/1999 | Valko et al. |
| 5,983,099 A | 11/1999 | Yal et al. |
| 6,014,556 A | 1/2000 | Bhatia et al. |
| 6,032,051 A | 2/2000 | Hall et al. |
| 6,119,017 A | 9/2000 | Cassidy et al. |
| 6,178,323 B1 | 1/2001 | Nagata |
| 6,381,467 B1 | 4/2002 | Hill et al. |
| 6,490,452 B1 | 12/2002 | Boscovic et al. |
| 6,526,377 B1 | 2/2003 | Bubb |
| 6,625,645 B1 | 9/2003 | Van Horne et al. |
| 6,947,723 B1 * | 9/2005 | Gurnani et al. ............... 455/406 |
| 7,062,253 B2 | 6/2006 | Money et al. |
| 2002/0055364 A1 | 5/2002 | Wang et al. |
| 2002/0071445 A1 | 6/2002 | Wu et al. |
| 2002/0107000 A1 | 8/2002 | Goss et al. |
| 2002/0120729 A1 | 8/2002 | Faccin et al. |

(Continued)

FOREIGN PATENT DOCUMENTS

EP      0 817 457      1/1998

OTHER PUBLICATIONS

C. Perkins, IP Mobility Support, Internet Engineering Task Force Request for Comment 2002, Oct. 1996.

*Primary Examiner* — George Eng
*Assistant Examiner* — Muthuswamy Manoharan (57) ABSTRACT

A method and system for managing subscriber payments is disclosed. When a subscriber account reaches a threshold state, the subscriber may be directed to a payment platform that requests the subscriber to make a payment in order to continue using telecom service. As described, a billing system determines the subscriber's rate of usage of telecom service so far in a current billing period and then applies the determined rate of usage to predict a quantity of telecom service that the subscriber will use in the remainder of the billing period. The billing system then computes an overage charge for at least a portion of the predicted quantity of telecom service and conveys at least that overage charge to the payment platform. The payment platform then requests the subscriber to pay at least the computed overage charge, preferably as a condition to the subscriber using further telecom service.

10 Claims, 3 Drawing Sheets

U.S. PATENT DOCUMENTS

| | | |
|---|---|---|
| 2002/0145990 A1 | 10/2002 | Sayeedi |
| 2002/0147818 A1 | 10/2002 | Wengrovitz |
| 2002/0172165 A1 | 11/2002 | Rosen et al. |
| 2002/0172169 A1 | 11/2002 | Rosen et al. |
| 2002/0173325 A1 | 11/2002 | Rosen et al. |
| 2002/0173326 A1 | 11/2002 | Rosen et al. |
| 2002/0173327 A1 | 11/2002 | Rosen et al. |
| 2002/0177461 A1 | 11/2002 | Rosen et al. |
| 2002/0191583 A1 | 12/2002 | Harris et al. |
| 2003/0008635 A1* | 1/2003 | Ung et al. ............... 455/408 |
| 2003/0008657 A1 | 1/2003 | Rosen et al. |
| 2003/0157925 A1* | 8/2003 | Sorber et al. ............ 455/406 |
| 2005/0027624 A1* | 2/2005 | Cai ........................... 705/32 |
| 2005/0037731 A1* | 2/2005 | Whewell et al. .......... 455/406 |
| 2006/0019632 A1* | 1/2006 | Cunningham et al. .... 455/408 |
| 2010/0104078 A1* | 4/2010 | Henry et al. .......... 379/114.17 |

* cited by examiner

PREDICTIVE PAYMENT SUGGESTION IN A TELECOMMUNICATION SYSTEM

FIELD OF THE INVENTION

The present invention relates to telecommunication service and, more particularly, to management of subscriber billing accounts.

BACKGROUND

In the existing art, when a user signs up for telephone service with a telephone carrier, the user typically enters into a pre-pay/post-pay service contract. According to such a contract, the user agrees to pay the carrier a recurring amount of money in advance of each billing period in exchange for using a designated quantity of telephone service during the billing period. After the billing period, the carrier then bills the user an overage charge for any use of service that exceeded the designated quantity in the billing period. In addition, if the user incurs other charges during the billing period, such as for acquiring media (e.g., ringtones, screensavers, games, etc.) or hardware (e.g., telephones, accessories, etc.) from the carrier, the carrier may include those additional charges on the user's bill as well.

By way of example, a subscriber may sign up for a monthly service plan that gives the subscriber 1,000 base minutes of service per month for a cost of $40.00, with an overage charge of $0.10 per minute. Thus, in advance of each month, the subscriber would pay the carrier $40.00. If, during a given month, the subscriber then used 1,235 minutes of service and incurred $75.00 of purchase charges (e.g., for media or hardware), the carrier would thereafter bill the subscriber for an overage charge of $23.50 plus the purchase charge of $75.00.

Recognizing that certain subscribers are credit challenged, in that they tend to not pay their bills on time if at all, a carrier may further impose spending caps on certain subscribers. For instance, a carrier may limit certain subscribers to incur no more than a specified maximum in excess charges (including, for example, overage charges and purchase charges) beyond the subscriber's base service plan per billing period. Once the subscriber hits the specified maximum limit in excess charges, the carrier may then take an action such as cutting off the subscriber's service until the subscriber pre-pays an additional amount to the carrier.

By way of example, a carrier may impose a $100.00/month excess spending cap on certain subscribers. In a given month, if such a subscriber then incurs excess charges (such as overage charges and/or purchase charges) totaling or exceeding $100.00, the carrier may then block the subscriber from placing or receiving further calls until the subscriber pre-pays an additional amount to the carrier. To enforce this policy in practice, the carrier may automatically re-direct subsequent call attempts by the subscriber to a voice-response platform that will explain the situation to the subscriber and ask the subscriber to pay an additional amount in order to maintain service. Once the subscriber pays an additional amount, the carrier may then allow the subscriber to place the call or may automatically connect the subscriber's attempted call.

At issue in this or similar arrangements, however, is what amount of money the subscriber should pay to the carrier in order to maintain telecom service. Unfortunately, as a general matter, credit-challenged subscribers faced with this question will tend to pay the carrier just a small amount of additional money, so that the carrier will allow them to place their currently attempted call. Yet such subscribers will then likely face the same situation again the next time they seek to place a call. Therefore, a better solution is desired.

SUMMARY

The present invention is directed to a method and system for managing subscriber payments. The invention can be applied in a scenario such as that described above, for instance, or in other scenarios where it would make sense to determine how much money a subscriber should pre-pay or otherwise pay to a telephone carrier or other entity.

In a preferred embodiment, an exemplary method will involve predicting how much money in overage charges the subscriber is likely to incur for the remainder of the billing period, considering the rate at which the subscriber has used telecom service so far in the billing period. The carrier may then ask the subscriber to pay at least that predicted overage charge. Further, the carrier may additionally request the subscriber to pay any additional charges that the subscriber has actually incurred so far in the billing period, such as purchase charges or overage charges, whether or not those additional charges exceed the subscriber's spending cap.

These as well as other aspects, advantages, and alternatives will become apparent to those of ordinary skill in the art by reading the following detailed description with reference where appropriate to the accompanying drawings.

DETAILED DESCRIPTION

An exemplary embodiment of the invention will be described here in the context of a cellular wireless communication system, where telecom carriers commonly bill subscribers with a pre-pay/post-pay arrangement like that described above. However, it should be understood that the invention can equally apply in other scenarios, such as with respect to other telecommunication services, whether wireless or landline. Further, the principles of the invention can be applied as well to other sorts of services, such as other utilities for instance.

Those skilled in the art will also appreciate that the description provided below is intended to illustrate and explain the invention by way of example only, and that numerous variations may be possible now or developed in the future, while remaining within the scope of the claimed invention. As such, structural elements and functions can be added, omitted, modified, re-ordered, combined, distributed, or otherwise changed. Further, it should be understood that various functions described herein can be carried out by hardware, firmware, and/or software, such as by one or more microprocessors programmed with machine language instructions for instance.

Figure 1:
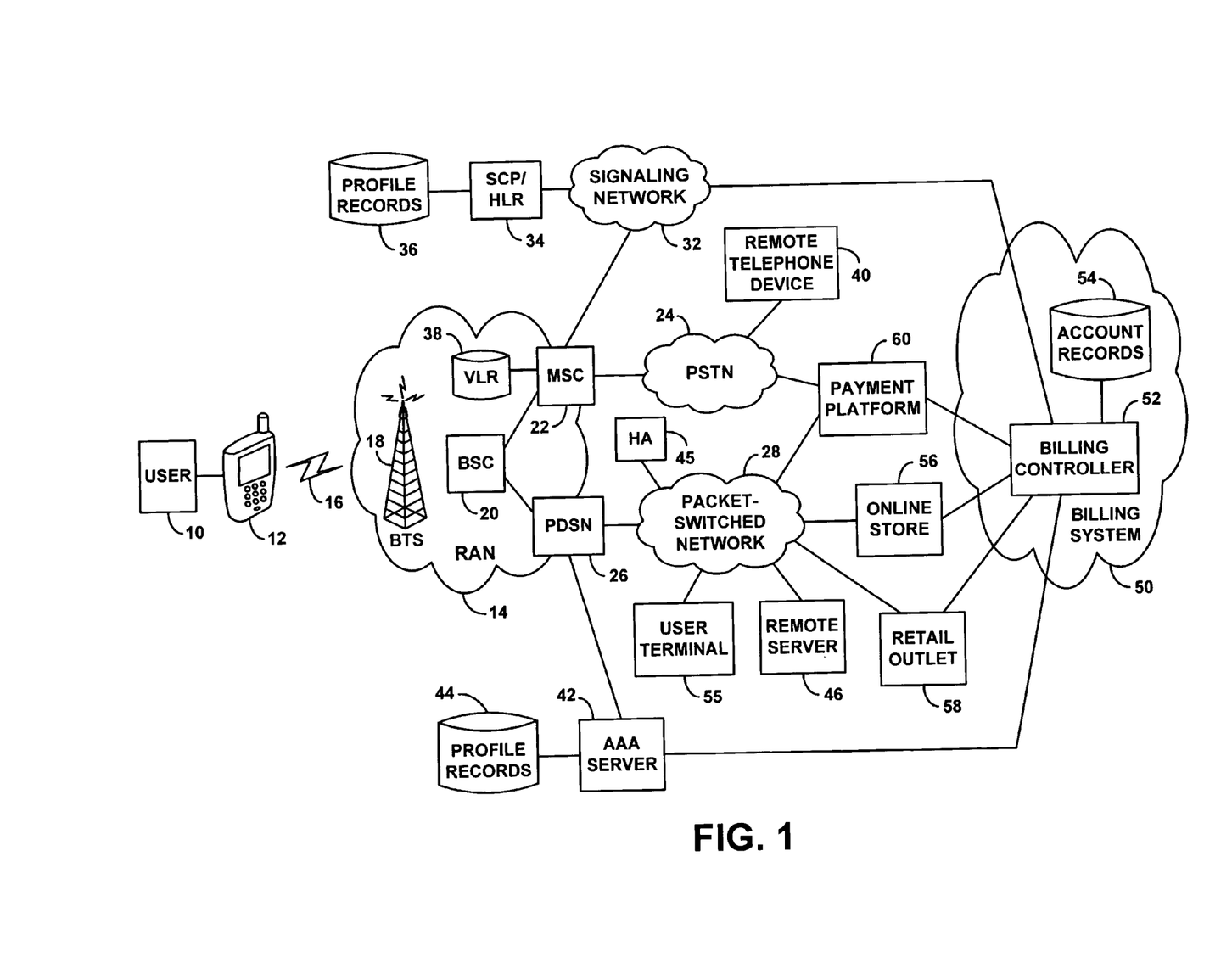
FIG. 1 is a block diagram of a telecommunications system in which an exemplary embodiment of the invention can be implemented.

Referring to the drawings, FIG. 1 is a block diagram of a telecommunication system in which an exemplary embodiment of the invention can be implemented. As shown in FIG. 1, the system includes a cellular wireless communication device 12 in communication with a radio access network (RAN) 14 over an air interface 16. Device 12, operated by a user 10, can be a cellular telephone, a wirelessly equipped personal digital assistant (PDA) or computer, or other device adapted to communicate over air interface 16 with RAN 14. Air interface 16 may operate according to any air interface protocol now known or later developed, such as CDMA, TDMA, or GSM, for instance.

RAN 14 includes a base transceiver station (BTS) 18 that radiates to define a wireless coverage area in which device 12 can communicate over air interface 16 with the BTS 18. BTS 18 is then coupled with a base station controller (BSC) 20 that generally controls operation of the BTS 18 (and perhaps one or more other BTSs): BSC 20 is, in turn, coupled with or integrated in one or more nodes that provide connectivity with one or more transport networks. For instance, in the arrangement as shown, BSC 20 is coupled with a mobile switching center (MSC) 22 that provides connectivity with the public switched telephone network (PSTN) 24, and BSC 20 is further coupled with a gateway such as a packet data serving node (PDSN) 26 that provides connectivity with a packet-switched network 28 such as a private packet network or the Internet.

As noted above, this cellular wireless arrangement depicted is only one example. In an alternative embodiment, device 12 could be a landline telephone or computer coupled by a landline (e.g. wired) connection with a switch or gateway (e.g., network access server) that provides connectivity with a transport network. Other arrangements are possible as well.

As shown in FIG. 1, MSC 22 is coupled with a signaling network 32, which provides connectivity with a service control point (SCP) and/or home location register (HLR) 34. SCP/HLR 34 includes or is coupled with a subscriber profile database 36, which contains service profile records for subscriber devices such as device 12. Further, when device 12 is registered with MSC 22, MSC 22 may maintain a copy of the service profile record for device 12 in a visitor location register (VLR) 38 for reference when setting up calls for device 12.

As a general matter, when user 10 seeks to call a remote telephone device 40 on PSTN 24, device 12 sends an origination request message over air interface 16 to RAN 14, providing the telephone number of the remote device 40. Upon receipt of the origination message, MSC 22 may send a signaling message (e.g., an IS-41 Origination Request message) to SCP/HLR 34 for assistance with call processing. SCP/HLR 34 may then reference the service profile record for device 12 to determine how to handle the call and may instruct MSC 22 accordingly. Under normal circumstances, MSC 22 may then set up the call to the remote device 38 over PSTN 24 and may then allow the call to proceed.

PDSN 26, on the other hand, is communicatively linked with an authentication, authorization, and accounting (AAA) server 42, which similarly includes or is coupled with a subscriber profile database 44 containing service profile records for subscriber devices such as device 12. (For simplicity, FIG. 1 shows a direct link between PDSN 26 and AAA server 42. In typical practice, however, the PDSN and AAA server may communicate with each other through packet-switched network 28.)

When user 10 seeks to engage in data communication over packet-switched network 28 (such as a web browsing session, a voice-over-IP session, or another sort of data communication), device 12 sends a packet-data origination message, or connection message, over the air interface 16 to RAN 14. Upon receipt of the origination messages, PDSN 26 may engage in signaling with AAA server 42 to determine whether the device is authorized to engage in packet-data communications. PDSN 26 may then reference the service profile record for device 12 and may instruct PDSN 26 accordingly. Under normal circumstances, PDSN 26 may then engage in signaling with a mobile-IP home agent 45 on the packet-switched network to facilitate acquisition of an IP address for use by device 12. Upon acquisition of an IP address, device 12 may then engage in IP communications on packet-switched network, to communicate with other IP nodes, such as a remote server 46 for instance.

To track usage of telecom service and to facilitate billing users for the service, the system of FIG. 1 further includes a billing system 50. The billing system 50 can be as simple as a single computer or as complex as a network of computers and/or other equipment. As shown by way of example, the billing system 50 may include a billing controller 52 and an account database 54. Generally speaking, account database 54 contains subscriber account records, each of which may indicate an extent of a subscriber's usage and other charges to date in a current billing period and may further indicate other subscriber information, such as service profile information for instance. Billing controller 52 generally functions to receive and process usage and charge information and to maintain the account records in database 54.

In the exemplary embodiment, one function of billing system 50 is to track the extent to which a subscriber has engaged in telephone calling service via MSC 22. To facilitate this, billing system 50 is preferably coupled with signaling network 32, so that billing system 50 can receive usage reports from MSC 22. In typical practice, MSC 22 will be arranged to generate and send to billing system 50 a call detail record (CDR) for each call that MSC 22 handles. Each CDR may take the form of a database record and may include call information such as the calling number, the called number, the start time, the stop time, and the call duration.

Upon receipt of each CDR, billing controller 52 may then extract relevant information from the CDR and update an account record in database 54 accordingly, to increment a record of the subscriber's usage so far in the current billing period. For instance, if device 12 engages in a 10 minute call with remote telephone 38, MSC 22 may send billing system 50 a CDR that describes the call, and billing controller 52 may update the subscriber account record for device 12 to increment a running usage total by 10 minutes.

Note that the extent of calling service could be tracked in other increments as well, such as seconds for instance. Further, factors such as call distance or time of day can be considered in establishing an extent of a subscriber's usage. Still further, MSC 22, billing system 50, or another entity could be arranged to discount certain calling activity by subscribers, such as calls of particular types or calls placed to particular entities for instance.

Another function of billing system 50 in the exemplary embodiment is to track the extent to which a subscriber has engaged in data communication service via PDSN 26. To facilitate this, billing system 50 is preferably coupled with AAA server 42, so that billing system 50 can receive usage reports from AAA server 42. (For simplicity, FIG. 1 shows a direct link between AAA server 42 and billing system 50. In typical practice, however, the AAA server and billing system may communicate with each other through packet-switched network 28.)

In typical practice, PDSN 26 will be arranged to generate and send to AAA server 42 usage data records (UDRs) for each packet-data communication session that that it handles. More particularly, at the start of the session, the gateway may send a START UDR, at the end of the session, the gateway may send a STOP UDR, and periodically during the session, the gateway may send other UDRs. Each UDR may be compliant with the RADIUS (Remote Authentication Dial In User Service) protocol and may provide information such as a session ID, a subscriber ID, the subscriber's assigned IP address, and the number of bytes of data communicated so far during the session. Like CDRs, each UDR is typically formatted as a database record with predefined fields.

Periodically, or in response to a triggering event (such as receipt of each UDR, or receipt of a request from the billing system 50), AAA server 42 may programmatically send to the billing system 50 the UDRs that it has received. Based on the UDRs, subscriber service plans, and perhaps other data, the billing system 50 will then compute and apply charges to subscriber accounts, incrementing the subscriber's usage so far in the current billing period. For instance, if device 12 engages in a 600 kilobyte data communication session, billing controller 52 may receive one or more UDRs indicative of the session, and billing controller 52 may update the subscriber account record for device 12 to increment a running usage total by 600 kilobytes.

Note that the extent of data communication service could be tracked in other increments as well, such as in megabytes for instance. Further, other factors can be considered in establishing an extent of a subscriber's usage. Still further, PDSN 26, billing system 50, or another entity could be arranged to discount certain data communication activity by subscribers, such as sessions of particular types or sessions with particular entities for instance.

In addition to engaging in telecommunication service such as calling service and data communication service, user 10 may incur other charges during a given billing period, and billing system 50 will preferably track those other charges as well to facilitate billing for the charges.

By way of example, user 10 may operate device 12 or another terminal 55 (e.g., a desktop computer) to browse and make purchases (such as to acquire media, hardware, or service enhancements) at an online store 56 on packet-switched network 28, and the user may charge those purchases to the account of device 12. As shown, the online store 56 is preferably coupled with billing system 50, so that billing system 50 can receive charge reports from the online store 56. (For simplicity, FIG. 1 shows a direct link between online store 56 and billing system 50. In typical practice, however, the online store and billing system may communicate with each other through packet-switched network 28.)

For instance, when user 10 makes a $45.00 online purchase under the account of device 10 (e.g., having logged in with the username and password for device 10), online store 56 would send a signaling message to billing system 50 indicating the purchase amount. Upon receipt of the message, billing controller 52 may then update the subscriber account record for device 12 to increment a running charge total by $45.00.

Similarly, user 10 may make purchases at retail outlets (e.g., carrier-operated brick-and-mortar stores). As shown, such a retail outlet 58 is preferably coupled with the billing system 50, so that billing system 50 can receive charge reports from the retail outlet 58. (For simplicity, FIG. 1 shows a direct link between retail outlet 58 and billing system 50. In typical practice, however, the retail outlet and billing system may communicate with each other through packet-switched network 28.)

For instance, when user 10 visits retail outlet 58 and makes a $65.00 purchase under the account of device 10, retail outlet 58 may send a signaling message to billing system 50 indicating the purchase amount. Upon receipt of the message, billing controller 52 may then update the subscriber account record for device 12 to increment a running charge total by $65.00.

In accordance with the exemplary embodiment, billing controller 52 or another entity will be arranged to monitor a subscriber's account balance, and to trigger a payment-session with the subscriber when the account balance reaches a threshold state. As noted above, for instance, the threshold state may be a threshold charge total on the subscriber's account so far in the current billing period. For example, if the subscriber has a spending cap of $100.00 per billing period and the subscriber has incurred one or more charges (e.g., purchase charges and/or overage charges) totaling $105.00 so far in the billing period, then the billing controller 52 may trigger a payment-session.

A payment-session can itself take various forms but, in a preferred embodiment, generally involves connecting the subscriber with a payment platform 60 and having the subscriber interact with the payment platform 60 to make a payment. Through the payment-session, for instance, the payment platform 60 will request the subscriber to make at least a specified payment, and the payment platform 60 may then receive the subscriber's payment, in the form of a credit-card payment for instance.

As shown in FIG. 1, the payment platform may be coupled with the PSTN 24 and with the packet-switched network 28, to facilitate connecting the subscriber to the platform via the PSTN or the packet-switched network. Further, the platform is preferably coupled with billing system 52, to facilitate receiving information about the subscriber's account status and receiving an indication of how much money the platform should request the subscriber to pay.

The payment platform 60 can be arranged to interact with a subscriber by voice and/or data communication. To facilitate voice interaction, the platform 60 may comprise a programmed interactive voice response unit (IVRU) or other voice command platform (VCP) that interfaces between billing system 50 and the subscriber. Such a platform may operate according to the well known Voice-XML (VXML) protocol and would typically include one or more text-to-speech (TTS) engines and one or more speech-recognition (SR) engines. Alternatively, the platform may comprise an operator terminal, at which a human operator can engage in data communication with the billing system 50 and can speak with the subscriber by telephone. To facilitate data interaction, on the other hand, the platform may comprise a web server that interfaces between the billing system 50 and the subscriber.

Billing system 50 can trigger a payment-session with a subscriber in various ways. In one embodiment, for example, billing controller 52 can regularly monitor the subscriber's account to determine when the subscriber's account reaches the threshold state (e.g., charges equal to or exceeding the subscriber's spending cap). When the billing controller 52 detects the threshold state, the billing controller 52 may send a BLOCK signal to various network entities to instruct the entities that further subscriber activity, such as telecom service or purchases, should be blocked and that the subscriber should be connected with payment platform 60.

For instance, when billing controller 52 detects that the account of device 12 has reached the threshold state, the billing controller may send a BLOCK signal as a specially coded SS7 message to SCP/HLR 34. SCP/HLR 34 may then responsively update the service profile record for device 12 to indicate that, when device 12 next tries to place a call, the call should be routed to payment platform 60 for handling. SCP/HLR 34 may propagate that profile record change to VLR 38 as well. Thus, when device 12 next tries to place a call, MSC 22 may signal to SCP/HLR 34 for call processing guidance, and, pursuant to the device's profile record, SCP/HLR 34 would direct MSC 22 to set up the call to payment platform 60, rather than to the dialed number.

Similarly, when billing controller 52 detects that the account of device 12 has reached the threshold state, the billing controller may send a BLOCK signal as a specially coded HTTP message to AAA server 42. AAA server 42 may then responsively update the service profile record for device 12 to indicate that, when device 12 next tries to engage in a data communication session, the device should be connected to payment platform 60 for handling. Thus, when device 12 next tries to engage in a data communication session, and PDSN 26 queries AAA server 42 for authorization, AAA server 42 may responsively instruct PDSN 26 to route data messages (e.g., SIP messages, HTTP messages, etc.) from device 12 to payment platform 60, rather than to their specified destinations.

Also similarly, when billing controller 52 detects that the account of device 12 has reached the threshold state, the billing controller may send a BLOCK signal as a specially coded HTTP message to online store 56. Online store 56 may maintain a record of that BLOCK signal in data storage and, when faced with a subsequent purchase attempt under the account of device 12, may redirect the purchasing party to the payment platform 60.

In an alternative embodiment, however, rather than having billing controller 52 notify various network entities when a subscriber's account reaches a threshold state, each of the network entities can instead be arranged to query the billing controller 52 (or an associated element) each time the subscriber seeks to engage in particular subscriber activity, such as telecom service or purchases. An advantage of this arrangement is that the payment trigger logic can remain centralized at the billing system rather than being propagated to each applicable network entity.

By way of example, when MSC 22 receives a call request from device 12, MSC 22 may signal to SCP/HLR 34 to request call processing guidance. SCP/HLR 34 may then determine from the device's profile record that the device is subject to credit monitoring. In response, SCP/HLR 34 may signal to billing controller 52 to determine whether the device's account is at the threshold state. The billing controller 52 may then consult the device's account record to determine whether the account is at the threshold state and may send a corresponding response back to the SCP/HLR 34. If the device's account is at the threshold state, then the SCP/HLR 34 may instruct the MSC 22 to set up the call to the payment platform 60, and MSC 22 may do so. On the other hand, if the device's account is not at the threshold state, then the SCP/HLR 34 may instruct the MSC 22 to set up the call to its intended destination.

As another example, when PDSN 26 receives a packet-data session request from device 12, PDSN 26 may query AAA server 42 for authorization. In response, AAA server 42 may query billing controller 52 to determine whether the device's account is at the threshold state. The billing controller may then consult the device's account record to determine whether the account is at the threshold state and may send a corresponding response back to the AAA server 42. If the device's account is at the threshold state, AAA server 42 may then instruct PDSN 26 to redirect subsequent packet data communications (e.g., SIP messages, HTTP messages, etc.) from device 12 to the payment platform 60. On the other hand, if the device's account is not at the threshold state, then the AAA server 42 may instruct the PDSN to route packet data in a normal manner.

As still another example, when the online store 56 receives a purchase request seeking to charge a purchase to the account of device 12, the online store 56 may query billing server 52 to determine whether the device's account is at the threshold state. The billing controller may then consult the device's account record to determine whether the account is at the threshold state and may send a corresponding response back to the online store 56 If the device's account is at the threshold state, the online store 56 may redirect the device's purchase request (e.g., HTTP request) to the payment platform 60 for handling. On the other hand, if the device's account is not a the threshold state, then the online store 56 may process the purchase in a normal manner.

Note that in still another embodiment, a user can manually contact the payment platform to seek an indication of whether to pay additional money to the carrier. For instance, user 10 can operate device 12 to call or to browse to the payment platform 60. Alternatively, user 10 can operate some other telephone or computer to call or browse to the payment platform 60.

Still further, although several triggering mechanism are described above, others are possible as well. For instance, using the emerging 3G IMS (IP Multimedia Subsystem) framework, a call session control function (CSCF) could direct a session setup message (e.g., a SIP INVITE message) to a policy server, such as the billing controller 52 for instance, which can then cause the session setup message to be sent to the payment platform 60 (or can otherwise redirect the attempted session to the payment platform) if appropriate.

When a subscriber is connected with the payment platform 60, the payment platform will preferably receive an identifier of the subscriber, to facilitate interacting with the subscriber. The payment platform 60 may receive the identifier in the form of caller-ID (automatic calling number identification) information if possible. Alternatively, the payment platform 60 may receive the identifier in the form of a network access identifier (NAI) or other identifier carried in IP messaging from or on behalf of the subscriber. Still alternatively, the payment platform 60 may prompt the subscriber to specify an identifier, such as a telephone number, NAI, or other account identification information.

Provided with the identity of the subscriber, the payment platform 60 may then signal to the billing controller 52 to seek account status information and payment-request information for the subscriber. For instance, the payment platform 60 may send an HTTP message specifying the subscriber identifier in one or more header parameters, and the billing controller 52 may deliver the requested information to the payment platform 60 in the body of an HTTP response message.

Through interaction with the subscriber, the payment platform 60 may then notify the subscriber of the account status and may request and collect payment from the subscriber. For instance, the payment platform may state to the subscriber, "You have exceeded your $100.00 spending cap for the month. To continue using telecom service, you must make a payment of at least $X." And the payment platform may collect the requested amount as a credit card payment from the subscriber. Alternatively, the payment platform may state to the subscriber, "You have exceeded your $100.00 spending cap for the month. To make further purchases, you must make a payment of at least $X." And the payment platform may similarly collect the requested amount as a credit card payment from the subscriber.

Once the payment platform 60 receives the subscriber's payment of at least the requested amount of money, the payment platform 60 may send a signaling message to billing controller 52, and billing controller 52 may update the subscriber's account record to indicate that the account is no longer at the threshold state. For instance, the billing controller 52 may reduce the subscriber's total outstanding balance due, thus bringing it below the subscriber's spending cap. The payment platform 60 may then inform the subscriber that the subscriber may retry the attempted communication. Alternatively, if possible, the payment platform may itself connect the attempted communication to its intended destination.

On the other hand, if the payment platform 60 does not receive the subscriber's payment of at least the request amount of money, then the payment platform 60 may inform the subscriber that the subscriber will be precluded from further activity (e.g., further telecom service and/or further purchases) until the subscriber pays at least the requested amount. Thus, the payment platform 60 may condition further activity by the subscriber on the subscriber's payment of the requested amount.

In accordance with the exemplary embodiment, billing controller 52 will determine the amount of money the payment platform 60 should request the subscriber to pay, based at least in part on the subscriber's account activity to date in the current billing period. In particular, the billing controller 52 will take into consideration the rate at which the subscriber has used telecom services so far in the billing period, and the billing controller will apply that rate to the time left in the billing period in order to make a prediction of how much more telecom service the subscriber is likely to use in the remainder of the billing period. The billing controller will then use that prediction as a basis to determine a minimum amount of money the payment platform 60 should request the subscriber to pay.

Figure 2:
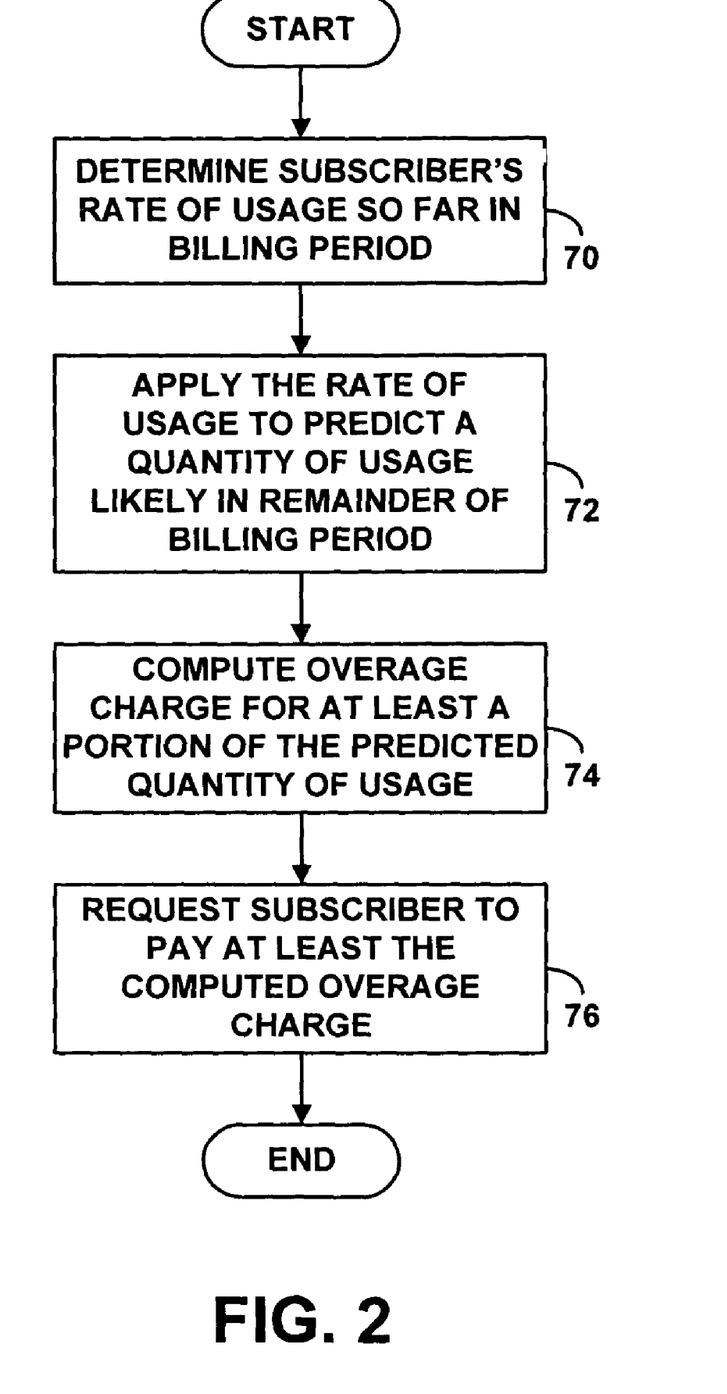
FIG. 2 is a flow chart depicting functions that can be carried out in accordance with the exemplary embodiment.

FIG. 2 is a flow chart generally depicting this process. As shown in FIG. 2, at step 70, the billing controller determines a subscriber's rate of usage of telecom service so far in a current billing period. At step 72, the billing controller applies the rate of usage to predict a quantity of telecom service that the subscriber will use in the remainder of the billing period. At step 74, the billing controller will then compute an overage charge for at least a portion of the predicted quantity of telecom service. Finally, at step 76, the payment platform will request the subscriber to pay at least the computed overage charge.

The steps depicted by way of example in FIG. 2 will preferably be carried out when the subscriber connects with the payment platform (or is connecting with the payment platform). For example the billing controller may carry out steps 70, 72, and 74 in response to a query from the payment platform, and the payment platform may carry out step 76 upon receipt of a response from the billing controller. Alternatively, the billing controller may carry out steps 70, 72, and 74 when the billing controller instructs an entity (such as MSC 22 or AAA server 42) to set up a communication to the payment platform, and the payment platform may carry out step 76 after receiving payment-request information from the billing platform. Other timing is possible as well.

In the exemplary embodiment, the function of determining a subscriber's rate of usage of telecom service so far in the current billing period may involve determining how many units of telecom service the subscriber has used so far in the billing period and dividing that number of units by the amount of time that has passed so far in the billing period. In turn, the function of applying that determined usage rate to predict a quantity of telecom service that the subscriber will use in the remainder of the billing period may involve determining how much time remains in the billing period and multiplying that remaining time by the determined usage rate.

The billing controller may determine the number units used so far in the billing period by referring to the subscriber's account record. And the billing controller may determine the amount of time that has passed so far in the billing period, as well as the amount of time remaining in the billing period, by referring to a local clock/calendar and to the subscriber's account record (e.g., to determine when the subscriber's billing period began and ends and where the current day falls within that period).

In determining the subscriber's rate of usage, the billing controller can round time to the nearest day or other desired increment, and the billing controller can round units of usage to a nearest whole unit. Units of usage for purpose of this determination can take any form, including but not limited to minutes, or quantities of data (e.g., kilobytes), for instance. Further, the billing period can be defined in any desired manner, such as monthly for instance.

By way of example, assume that the subscriber has a monthly service plan and that the subscriber gets connected to the payment platform on (e.g., at the end of) the 7th day of a 30 day monthly billing cycle. Assume further that the billing controller determines from the subscriber's account record that the subscriber has used 140 minutes of calling service so far in the month. In that scenario, the billing controller may conclude that the subscriber's usage rate so far in the current month is 140/7=20 minutes/day. The billing controller may then multiply that rate by the 23 days remaining in the month to predict that the subscriber is likely to use a total of 460 minutes of calling service in the remainder of the month.

The function of next computing an overage charge for at least a portion of the predicted quantity of telecom service may involve multiplying a per-unit overage fee to each overage unit of telecom service that the subscriber is predicted to use in the remainder of the billing period. The billing controller can determine the applicable overage fee per unit of service by referring to the subscriber's account record.

Continuing with the example above, for instance, assume that the subscriber's service plan grants the subscriber 200 base minutes but requires the subscriber to pay an overage fee of $0.10 per minute for each minute of service beyond 200. Since the subscriber has used 140 minutes so far, the subscriber has 200−140=60 base minutes left. Consequently, of the 460 minutes that the subscriber is predicted to use in the remainder of the month, 60 of those minutes will be base minutes and the remaining 460−60=400 minutes will be overage minutes. The billing controller may thus multiply the subscriber's per-minute overage fee of $0.10 by the 400 overage minutes to thereby compute a predicted overage charge of $40.00.

Alternatively, the function of predicting a quantity of service may itself involve considering only overage minutes, and the function of computing the overage charge can then involve considering just that predicted quantity of service. For instance, with the example above, the billing controller can first determine that the subscriber has used 140 of the subscriber's allotted 200 base minutes, leaving 60 base minutes in the month. The billing controller can then determine that, at the determined usage rate of 20 minutes/day, the subscriber's remaining base minutes will likely last another 3 days only, leaving 23−3=20 days in the billing period without any remaining base minutes. The billing controller may then multiply the usage rate of 20 minutes/day by the 20 overage days remaining in the month to predict that the subscriber will likely use 20×20=400 overage minutes in the remainder of the month. Applying the overage fee of $0.10 to those 400 overage minutes, the billing controller can then similarly compute a predicted overage charge of $40.00. Other computation methods can be used as well.

In the exemplary embodiment, the function of requesting the subscriber to pay at least the computed overage charge may involve requesting the subscriber to pay the computed overage charge. In the above example, for instance, the function may involve the payment platform requesting the subscriber to pay $40.00.

Alternatively, the function of requesting the subscriber to pay at least the computed overage charge may involve requesting the subscriber to pay the computed overage charge plus some additional amount. For instance, the function may involve requesting the subscriber to pay the overage charge plus one or more additional charges that the subscriber has actually incurred so far in the billing period. The additional charges can include any overage charges that the subscriber has actually incurred so far in the billing period. Further, or alternatively, the additional charges can include any purchase charges that the subscriber has incurred beyond the subscriber's spending cap (if any such cap exists) or perhaps any purchase charges that the subscriber has incurred so far in the billing period regardless of whether they exceed a spending cap.

By way of example, if the subscriber has already used 30 overage minutes beyond the subscriber's base 200 minutes, the billing controller may direct the payment platform to request a total of $40.00 (predicted overage charge)+$3.00 (actual overage charge)=$43.00 from the subscriber, and the payment platform may do so.

As another example, if the subscriber has already made $105.00 of purchases of games, ringtones, or other items from online store 56 or retail outlet 58, the billing controller may direct the payment platform to request a total of $40.00 (predicted overage charge)+$5.00 (actual purchase charges over the subscriber's spending cap)=$45 from the subscriber, and the payment platform may do so. Alternatively, the billing controller may direct the payment platform to request a total of $40.00 (predicted overage charge)+$115 (actual purchase charges)=$155.00 from the subscriber, and the payment platform may do so. Other examples are possible as well.

Figure 3:
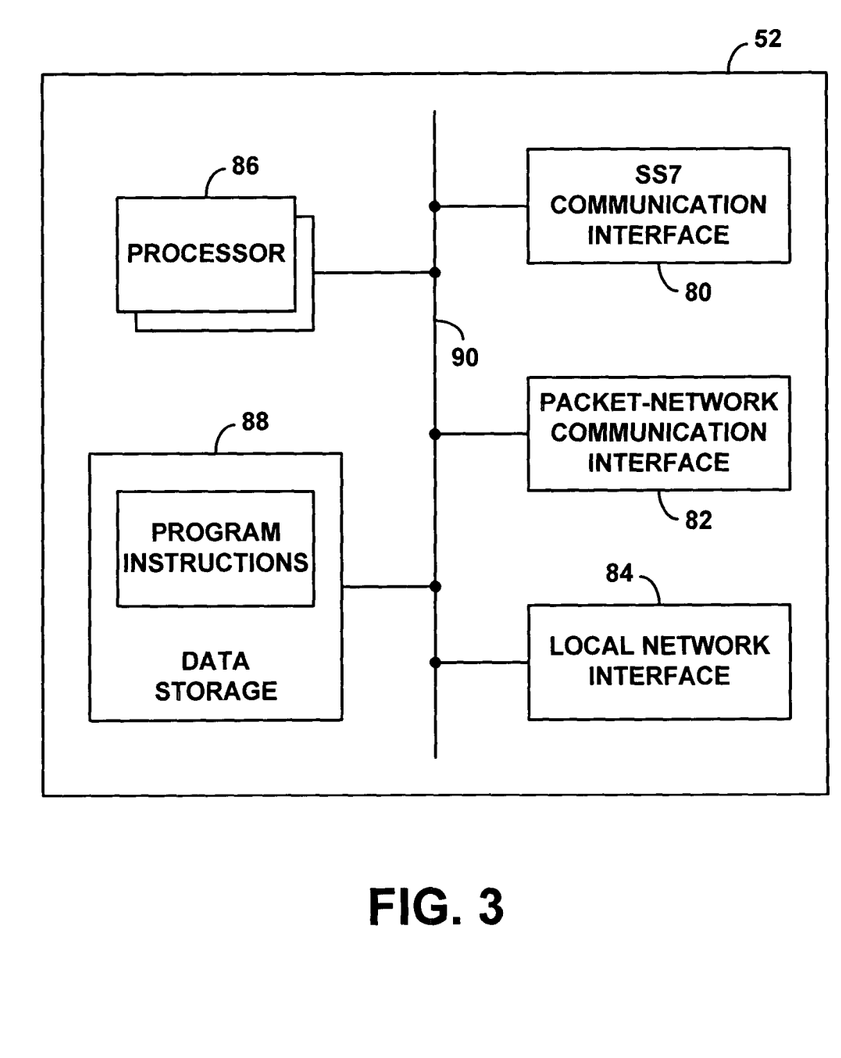
FIG. 3 is a block diagram of a billing controller arranged to carry predict an overage charge for a subscriber, in accordance with the exemplary embodiment.

Referring next to FIG. 3, a block diagram of an exemplary billing controller 52 is provided. As shown, the billing controller includes an SS7 communication interface 80, a packet-network interface 82, a local network interface 84, a processor 86, and data storage 88, all of which may be coupled together by a system bus, network, or other mechanism 90.

SS7 communication interface 80 comprises a network communication module and port for coupling with signaling network 32, so that billing controller 52 can communicate with SCP/HLR 34 for instance. Packet-network interface comprises a network communication module (e.g., an Ethernet interface module) and port for coupling with packet-switched network 28, so that billing controller can communicate with various entities such as AAA server 42, online store 56, retail outlet 58, and payment platform 60, for instance. Local network interface 84 similarly comprises a network communication module and port for coupling with a local network on which account database 54 sits, so that the billing controller can access the account database 54.

Processor 86 comprises one or more general purpose processors (e.g., INTEL microprocessors) and/or one or more special purpose processors (e.g., digital signal processors). Data storage 88, in turn, comprises one or more optical, magnetic, organic or other storage components, whether volatile and/or non-volatile. Data storage 88 preferably contains program instructions (e.g., machine language instructions) that are executable by processor 86 to carry out the various functions described herein.

In turn, payment platform 60 may comprise means for requesting the subscriber to pay at least a computed overage charge as a condition to the subscriber continuing to use telecom service and perhaps as a condition to the subscriber engaging in carrier-related activity (such as making further purchases, for instance). Alternatively, billing controller 52 or some other entity could function to convey the request to the subscriber.

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:

in the midst of a billing period, a billing controller determining a subscriber's rate of usage of telecom service so far in the billing period, wherein the subscriber operates under a service plan that grants the subscriber a base number of units of usage per billing period and that requires the subscriber to pay a set fee per unit of usage, if any, beyond the base number;

the billing controller applying the rate of usage to predict a quantity of telecom service that the subscriber will use in the remainder of the billing period;

the billing controller computing an overage charge for at least a portion of the predicted quantity of telecom service, wherein computing the overage charge for at least the portion of the predicted quantity of telecom service comprises:

multiplying the set fee by the predicted quantity of telecom service to establish the overage charge if the subscriber does not have any unused base units of usage remaining in the billing period; and if the subscriber has any unused base units of usage remaining in the billing period, then (i) reducing the predicted quantity of telecom service by the unused base unit(s), and (ii) then multiplying the set fee by the reduced quantity, to establish the overage charge for at least the portion of the predicted quantity of telecom service;

the billing controller causing a payment platform to refuse to provide telecom service to the subscriber for the remainder of the billing period until the subscriber pays at least the computed overage charge for at least the portion of the predicted quantity of telecom service; and, if the subscriber has not paid the computed overage charge, the billing controller causing a communication session initiated by the subscriber to be rerouted to the payment platform until the subscriber pays at least the computed overage charge for at least the portion of the predicted quantity of telecom service.

2. The method of claim 1, further comprising:

the payment platform requiring the subscriber to pay one or more charges that the subscriber has actually incurred so far in the billing period.

3. The method of claim 2, further comprising:

the payment platform resuming delivery of telecom service to the subscriber upon (i) the subscriber's payment of at least the computed overage charge for at least the portion of the predicted quantity of telecom service and (ii) the subscriber's payment of the one or more actually-incurred charges.

4. The method of claim 1, further comprising:
an online store receiving a purchase request from the subscriber;
the online store redirecting the subscriber to the payment platform if the subscriber has not paid at least the computed overage charge for at least the portion of the predicted quantity of telecom service;
the payment platform refusing to provide telecom service to the subscriber for the remainder of the billing period until the subscriber pays at least the computed overage charge for at least the portion of the predicted quantity of telecom service.

5. The method of claim 4, wherein the payment platform comprises an interactive voice response platform.

6. The method of claim 1, wherein the telecom service comprises cellular wireless telecom service.

7. The method of claim 1, wherein the units of usage comprise minutes of usage.

8. The method of claim 1, wherein the units of usage comprise units of data.

9. A system comprising:
at least one processor;
data storage;
program instructions stored in the data storage and executable by the at least one processor to (i) determine a subscriber's rate of usage of telecom service in the midst of a current billing period, (ii) apply the rate of usage to predict a quantity of telecom service that the subscriber will use in the remainder of the billing period, assuming that the subscriber will use telecom service at the same rate that the subscriber has used telecom service so far in the current billing period, (iii) compute an overage charge for at least a portion of the predicted quantity of telecom service, (iv) cause a payment platform to refuse to provide telecom service to the subscriber for the remainder of the current billing period until the subscriber pays at least the computed overage charge, and (v) if the subscriber has not paid the computed overage charge for at least the portion of the predicted quantity of telecom service, cause a communication session initiated by the subscriber to be rerouted to the payment platform until the subscriber pays at least the computed overage charge for at least the portion of the predicted quantity of telecom service.

10. The system of claim 9, wherein the telecom service is cellular wireless telecom service.

\* \* \* \* \*